US010061116B2

(12) United States Patent
Sano et al.

(10) Patent No.: US 10,061,116 B2
(45) Date of Patent: *Aug. 28, 2018

(54) TUNABLE INTERFERENCE FILTER, OPTICAL MODULE, AND ELECTRONICS APPARATUS

(71) Applicant: Seiko Epson Corporation, Tokyo (JP)

(72) Inventors: Akira Sano, Shiojiri (JP); Yasushi Matsuno, Matsumoto (JP)

(73) Assignee: Seiko Epson Corporation (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/724,414

(22) Filed: May 28, 2015

(65) Prior Publication Data

US 2015/0260981 A1    Sep. 17, 2015

Related U.S. Application Data

(63) Continuation of application No. 13/442,325, filed on Apr. 9, 2012, now Pat. No. 9,063,325.

(30) Foreign Application Priority Data

Apr. 11, 2011    (JP) ................. 2011-087225

(51) Int. Cl.
  *G02B 27/00*    (2006.01)
  *G02B 1/10*    (2015.01)
  (Continued)

(52) U.S. Cl.
  CPC .............. *G02B 26/001* (2013.01); *G01J 3/26* (2013.01); *G02B 5/28* (2013.01); *G02B 5/284* (2013.01); *G02B 5/285* (2013.01)

(58) Field of Classification Search
  CPC .... G02B 26/001; G02B 26/0841; G02B 5/28; G02B 5/284; G02B 5/285; G01J 3/26
  (Continued)

(56) References Cited

U.S. PATENT DOCUMENTS 5,561,523 A    10/1996 Blomberg et al.
6,833,957 B2 *  12/2004 Sato ................... G02B 6/29358
                                                356/454

(Continued)

FOREIGN PATENT DOCUMENTS

JP    2002-277758 A    9/2002
JP    2003-195189 A    7/2003
      (Continued)

*Primary Examiner* — Nicholas R Pasko
(74) *Attorney, Agent, or Firm* — Harness, Dickey & Pierce, P.L.C.

(57) ABSTRACT

A tunable interference filter includes: first and second opposed substrates; a first reflection film provided on a first reflection film fixing surface of the first substrate; a second reflection film provided on a second reflection film fixing surface of the second substrate and separated from the first reflection film by a gap; and a first electrode provided on a first electrode surface of the first substrate facing the second substrate, wherein the first electrode surface is spaced apart from the second substrate by a different distance than the first reflection film fixing surface, and a layered part in which the first reflection film and the first electrode are stacked is provided on the first electrode surface, the layered part being spaced apart from the second substrate by a larger distance than the first reflection film fixing surface.

8 Claims, 9 Drawing Sheets

(51) Int. Cl.
  *G02B 26/00* (2006.01)
  *G01J 3/26* (2006.01)
  *G02B 5/28* (2006.01)

(58) Field of Classification Search
  USPC ....... 359/290, 291, 297, 317, 318, 577, 578, 359/579, 584, 589, 850
  See application file for complete search history.

(56) References Cited

U.S. PATENT DOCUMENTS

| | | | |
|---|---|---|---|
| 7,015,457 | B2 | 3/2006 | Cole et al. |
| 7,046,422 | B2 | 5/2006 | Kimura et al. |
| 7,071,566 | B2 | 7/2006 | Cole et al. |
| 7,110,158 | B2 | 9/2006 | Miles |
| 7,130,103 | B2 | 10/2006 | Murata |
| 7,145,143 | B2 | 12/2006 | Wood et al. |
| 7,145,165 | B2 | 12/2006 | Cox et al. |
| 7,196,790 | B2 | 3/2007 | Cole |
| 7,301,703 | B2 | 11/2007 | Nakamura et al. |
| 7,304,800 | B2 * | 12/2007 | Nakamura ................ G01J 3/26 359/579 |
| 7,329,853 | B2 | 2/2008 | Cole et al. |
| 7,329,855 | B2 | 2/2008 | Katayama et al. |
| 7,470,894 | B2 | 12/2008 | Cole et al. |
| 7,483,211 | B2 | 1/2009 | Nakamura et al. |
| 7,525,713 | B2 * | 4/2009 | Nakamura ........... G02B 26/001 359/260 |
| 8,107,157 | B2 | 1/2012 | Tsuboi et al. |
| 8,817,268 | B2 * | 8/2014 | Sano ........................ G01J 1/04 356/454 |
| 9,063,325 | B2 * | 6/2015 | Sano ........................ G01J 3/26 |
| 2007/0133001 | A1 | 6/2007 | Cox et al. |
| 2007/0242920 | A1 | 10/2007 | Lin et al. |
| 2008/0100899 | A1 | 5/2008 | Shimokawa et al. |
| 2010/0027010 | A1 * | 2/2010 | Matsumoto ............... G01J 3/26 356/416 |
| 2010/0103522 | A1 * | 4/2010 | Matsumoto ............... G01J 3/26 359/578 |
| 2010/0226029 | A1 * | 9/2010 | Funasaka ........... G02B 27/0006 359/850 |
| 2010/0302660 | A1 * | 12/2010 | Hirokubo .................. G01J 3/26 359/850 |
| 2011/0019202 | A1 * | 1/2011 | Iwaki ........................ G01J 3/26 356/519 |
| 2011/0286072 | A1 | 11/2011 | Liu et al. |
| 2012/0188646 | A1 * | 7/2012 | Sano ........................ G01J 3/26 359/578 |
| 2012/0300208 | A1 | 11/2012 | Sano et al. |
| 2013/0083399 | A1 * | 4/2013 | Hirokubo .................. G01J 3/26 359/578 |
| 2014/0240836 | A1 * | 8/2014 | Shinto .................. G02B 26/001 359/578 |
| 2014/0268345 | A1 * | 9/2014 | Sano ........................ G01J 3/51 359/584 |
| 2015/0042362 | A1 * | 2/2015 | Shinto ...................... G01B 7/14 324/662 |
| 2015/0070767 | A1 * | 3/2015 | Nishimura ................ G01J 3/26 359/578 |
| 2015/0092272 | A1 * | 4/2015 | Shinto ...................... G02B 1/11 359/578 |

FOREIGN PATENT DOCUMENTS

| | | |
|---|---|---|
| JP | 2004-212673 A | 7/2004 |
| JP | 2011-008225 A | 1/2011 |

* cited by examiner

TUNABLE INTERFERENCE FILTER, OPTICAL MODULE, AND ELECTRONICS APPARATUS

CROSS-REFERENCE TO RELATED APPLICATIONS

This is a continuation patent application of U.S. application Ser. No. 13/442,325 filed Apr. 9, 2012, which claims priority to Japanese Patent Application No. 2011-087225 filed Apr. 11, 2011 both of which are expressly incorporated by reference herein in their entireties.

BACKGROUND

1. Technical Field

The present invention relates to a tunable interference filter, an optical module including the tunable interference filter, and an electronic apparatus including the optical module.

2. Related Art

A tunable interference filter in which reflection films are respectively oppositely provided across a predetermined gap on surfaces opposed to each other of a pair of substrates is known (for example, see JP-A-2002-277758).

In the tunable interference filter disclosed in JP-A-2002-277758, the reflection layers are respectively provided on the opposed surfaces of two optical substrates, and capacitance electrodes are provided at the outer sides in the radial direction of the reflection layers on the opposed surfaces of the optical substrates. In the tunable interference filter, the capacitance electrodes opposed to each other act as an electrostatic actuator, and a voltage is applied between the capacitance electrodes to vary the gap between the reflection layers by an electrostatic attractive force.

In the tunable interference filter, an electric charge may accumulate on the reflection layers, and, if the reflection layers opposed to each other are respectively charged, an electrostatic force is generated. Accordingly, even in the case where a predetermined set voltage is applied to the electrostatic actuator for setting the gap between the reflection layers to a set value, the gap may not be set to the desired set value due to the electrostatic force on the charged reflection layers. In this case, there is a problem that it is difficult to extract light having a desired wavelength from the tunable interference filter.

SUMMARY

An advantage of some aspects of the invention is to provide a tunable interference filter, an optical module, and an electronic apparatus that can extract light having a desired wavelength with high accuracy.

An aspect of the invention is directed to a tunable interference filter including a first substrate, a second substrate opposed to the first substrate, a first reflection film provided on a surface of the first substrate facing the second substrate, a second reflection film provided on a surface of the second substrate facing the first substrate and opposed to the first reflection film across a gap between the reflection films, and a first electrode provided on the surface of the first substrate facing the second substrate, wherein the first substrate has a first reflection film fixing surface provided with the first reflection film, and a first electrode surface provided with the first electrode, the first electrode surface being spaced apart from the second substrate by a different distance than the first reflection film fixing surface, and a layered part in which the first reflection film and the first electrode are stacked is provided on the first electrode surface and is spaced apart from the second substrate by a larger distance than the first reflection film fixing surface.

According to the aspect of the invention, the layered part formed by stacking the first reflection film and the first electrode is spaced apart from the second substrate more than the first reflection film fixing surface, and the first reflection film and the first electrode have surface contact so they are electrically connected at the layered part. Thereby, even when the first reflection film is charged, the accumulated charge may be released via the first electrode and generation of an electrostatic attractive force by charging between the first reflection film and the second reflection film may be prevented.

Here, it is conceivable that the edge of the first electrode and the edge of the first reflection film are brought into edge-to-edge contact for conduction. However, in this case, the contact area is smaller and conduction reliability is lower, and thus, the charge of the first reflection film may not be reliably released to the first electrode. On the other hand, as described above, by providing the layered part by stacking the first electrode and the first reflection film, the first electrode and the first reflection film may reliably be brought into surface contact and become electrically connected.

Further, in the aspect of the invention, the layered part is provided on the surface at a larger distance from the second substrate then the first reflection film fixing surface. Accordingly, the amount the gap between the reflection films and the gap between the electrodes may be varied is not suppressed by the presence of the layered part. Therefore, the wavelength range that can be extracted by the tunable interference filter is not narrowed.

In the tunable interference filter of the aspect of the invention, it is preferable that a second electrode is provided on the surface of the second substrate facing the first substrate and opposed to the first electrode via a larger gap between the first and second electrodes than exists between the reflection films, and the layered part is formed by extending the first reflection film from the first reflection film fixing surface over the first electrode surface and onto an inner peripheral edge of the first electrode.

In the tunable interference filter, a wavelength to be extracted by transmission or reflection is determined by the gap between the first reflection film and the second reflection film. Therefore, in the tunable interference filter, to acquire a transmitted or reflected wavelength in response to a wider wavelength range, it is desirable to widen the variation range of the gap between the reflection films. Here, in the case where a voltage is applied between the first electrode and the second electrode to vary the gap between the reflection films by an electrostatic attractive force, if the gap between electrodes is smaller than the gap between the reflection films, the gap between the reflection films may be varied only by the amount of the gap between electrodes. In the configuration, the variation range of the gap between the reflection films is smaller and the wavelength range that can be extracted by the tunable interference filter is narrower.

On the other hand, in the configuration described above, the gap between the electrodes is formed to be larger than the gap between the reflection films, and thus, the gap between the reflection films may be changed in a larger variation range, and the wavelength range that can be extracted by the tunable interference filter is made wider.

Further, generally, an electrostatic attractive force acting between the electrodes is inversely proportional to the square of distance, and, if the gap between the electrodes is smaller, control of the electrostatic attractive force becomes difficult and control of the gap between the reflection films becomes difficult. On the other hand, in the configuration described above, the gap between the electrodes is formed to be larger than the gap between the reflection films, and thus, the control of the electrostatic attractive force is easier and the gap between the reflection films may be set to a desired value with high accuracy.

In the tunable interference filter of the aspect of the invention, it is preferable that the layered part is formed by stacking the first reflection film on the first electrode.

In the configuration described above, the layered part has the configuration in which the first reflection film is stacked on the first electrode. That is, the first electrode is formed on the first substrate, and then, the first reflection film is formed partly thereon. Here, if the first reflection film is formed on the first substrate before the first electrode is formed, problems that the first reflection film is easily deteriorated when the first electrode is formed, and resolution of the tunable interference filter is lower, may arise. On the other hand, by first forming the first electrode on the first substrate, and then, forming the first reflection film thereon, the deterioration of the first reflection film in the manufacturing process may be suppressed. Therefore, the first reflection film having good reflection characteristics may be formed, and reduction of resolution in the tunable interference filter may be suppressed.

It is preferable that the tunable interference filter of the aspect of the invention includes a reflection film connection electrode connected to the second reflection film.

In the configuration described above, since the reflection film connection electrode is connected to the second reflection film, the charge accumulated in the second reflection film may be released from the reflection film connection electrode, and generation of an electrostatic force between the first reflection film and the second reflection film may be prevented more reliably. Therefore, the gap between the reflection films may be controlled with high accuracy by controlling the voltage applied to the first electrode and the second electrode.

Further, the reflection film connection electrode and the first electrode may be set at the same potential. In this case, no electrostatic attractive force is generated between the first reflection film and the second reflection film, and control of the gap between the reflection films may be performed easily with high accuracy.

Another aspect of the invention is directed to an optical module including the above described tunable interference filter, and a detection unit that detects light extracted by the tunable interference filter.

As described above, in the tunable interference filter of the aspect of the invention, even when the first reflection film is charged, the charge may be released from the first electrode and no electrostatic force is generated between the gap between the reflection films, and the dimension of the gap between the reflection films may accurately be controlled. Thereby, in the tunable interference filter, a light having a desired wavelength may be extracted by transmission or reflection with high accuracy. Further, in the optical module including the tunable interference filter, by detecting the amount of the light having the desired wavelength extracted by the tunable interference filter using the detection unit, the amount of the light having the desired wavelength may accurately be detected.

In the optical module of the aspect of the invention, it is preferable that the tunable interference filter includes a reflection film connection electrode connected to the second reflection film, and a voltage control unit is provided that controls the reflection film connection electrode and the first electrode at the same potential.

In the configuration described above, the voltage control unit sets the reflection film connection electrode connected to the second reflection film and the first electrode at the same potential. Thereby, the potential difference between the first reflection film and the second reflection film is zero, and no electrostatic attractive force is generated between the first reflection film and the second reflection film and the dimension of the gap between the reflection films may be controlled with high accuracy.

Still another aspect of the invention is directed to an electronic apparatus including the above described optical module.

According to the aspect of the invention, the electronic apparatus includes the optical module having the above described tunable interference filter, and thus, various kinds of electronic processing in the electronic apparatus may be performed based on the amount of the light having the desired wavelength detected with high accuracy.

BRIEF DESCRIPTION OF THE DRAWINGS

The invention will be described with reference to the accompanying drawings, wherein like numbers reference like elements.

DESCRIPTION OF EXEMPLARY EMBODIMENTS

Below, one embodiment according to the invention will be explained with reference to the drawings.

1. Overall Configuration of Colorimetric Instrument

Figure 1:
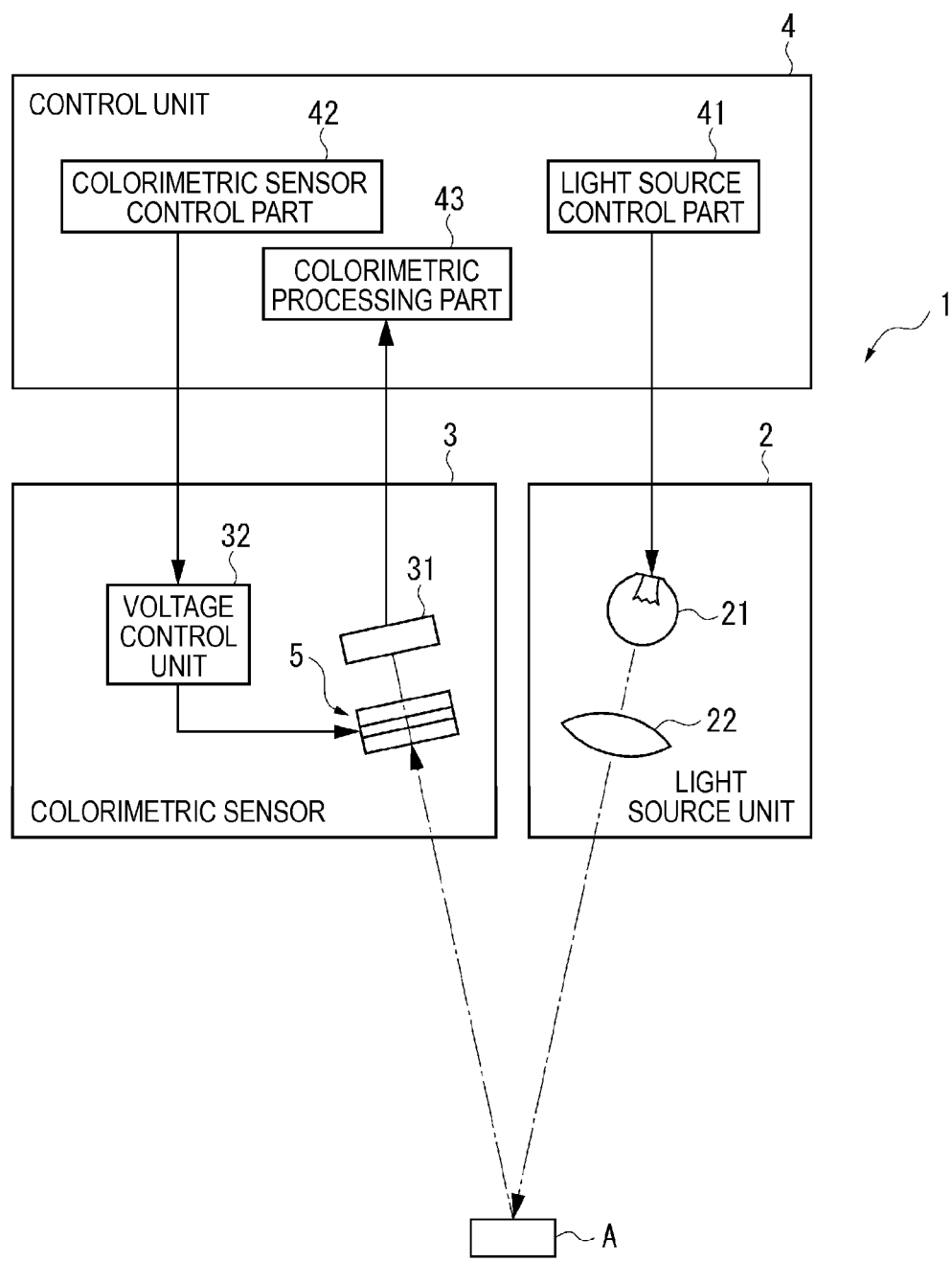
FIG. 1 is a block diagram showing a schematic configuration of a colorimetric instrument of one embodiment according to the invention.

FIG. 1 is a block diagram showing a schematic configuration of a colorimetric instrument 1 (electronic apparatus) of the embodiment.

The colorimetric instrument 1 includes a light source unit 2 that outputs light to a test object A, a colorimetric sensor 3 (optical module), and a control unit 4 that controls the operation of the colorimetric instrument 1 as shown in FIG. 1. Further, the colorimetric instrument 1 is a device that imparts light output from the light source unit 2 onto the test object A, receives the reflected test object light in the colorimetric sensor 3, and analyzes and measures the chromaticity of the test object light, i.e., the color of the test object A based on the detection signal output from the colorimetric sensor 3.

2. Configuration of Light Source Unit

The light source unit 2 includes a light source 21 and plural lenses 22 (only one is shown in FIG. 1), and outputs white light to the test object A. Further, the plural lenses 22 may include a collimator lens, and, in this case, the light source unit 2 collimates the white light output from the light source 21 into parallel light by the collimator lens and outputs it from a projection lens (not shown) toward the test object A. Note that, in the embodiment, the colorimetric instrument 1 including the light source unit 2 is exemplified, however, for example, in the case where the test object A is a light emitting member such as a liquid crystal panel, the light source unit 2 may be omitted.

3. Configuration of Colorimetric Sensor

The colorimetric sensor 3 includes a tunable interference filter 5, a detection unit 31 that receives light transmitted through the tunable interference filter 5, and a voltage control unit 32 that varies the wavelength of the light to be transmitted through the tunable interference filter 5 as shown in FIG. 1. Further, the colorimetric sensor 3 includes an incidence optical lens (not shown) that guides the reflected light (test object light) reflected on the test object A inward in a location facing the tunable interference filter 5. Furthermore, the colorimetric sensor 3 spectroscopically separates a light having a predetermined wavelength of the test object lights entering from the incidence optical lens by the tunable interference filter 5, and receives the spectroscopically separated light by the detection unit 31.

The detection unit 31 includes plural photoelectric conversion elements and generates electric signals in response to amounts of received light. Further, the detection unit 31 is connected to the control unit 4, and outputs the generated electric signals as light reception signals to the control unit 4.

3-1. Configuration of Tunable Interference Filter

Figure 2:
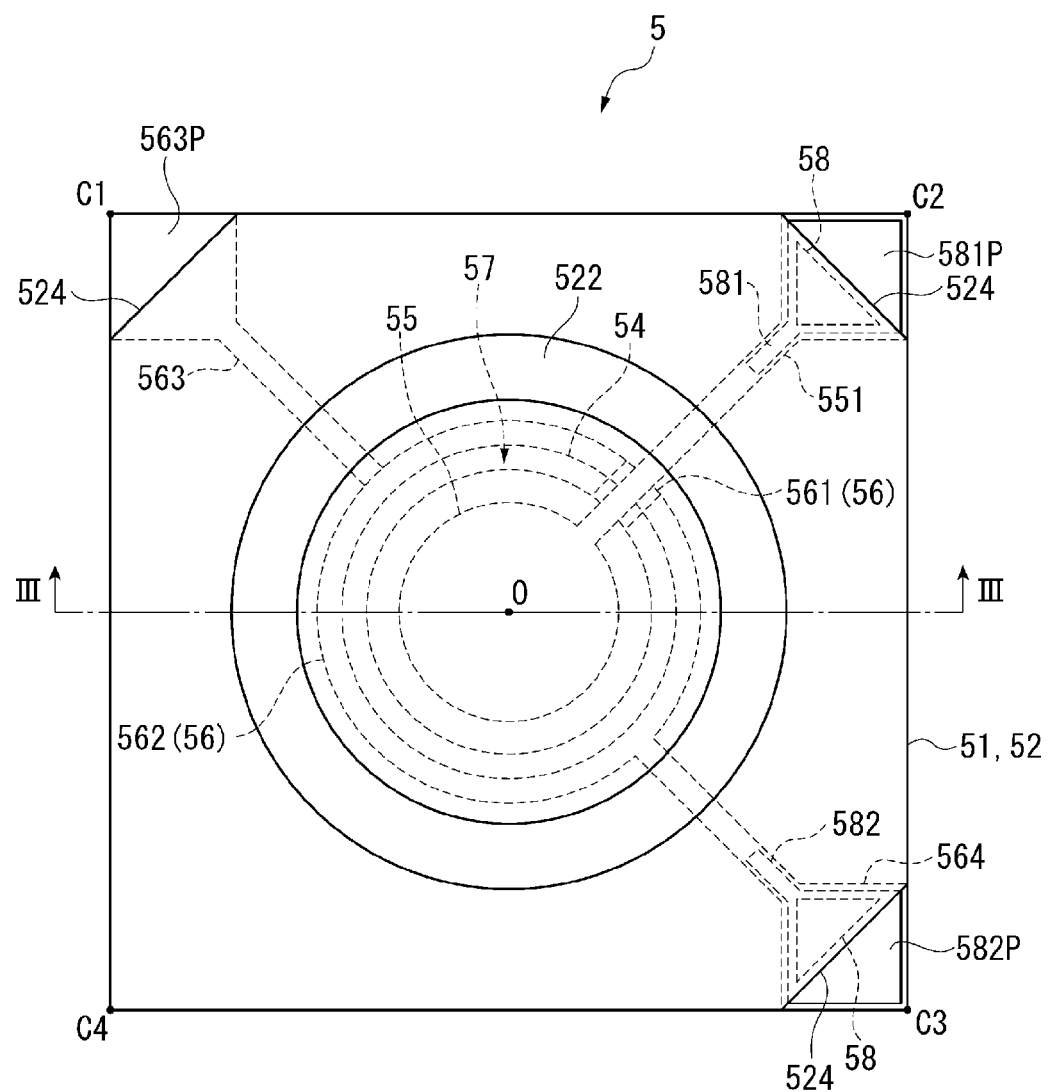
FIG. 2 is a plan view of a tunable interference filter of the embodiment.
Figure 3:
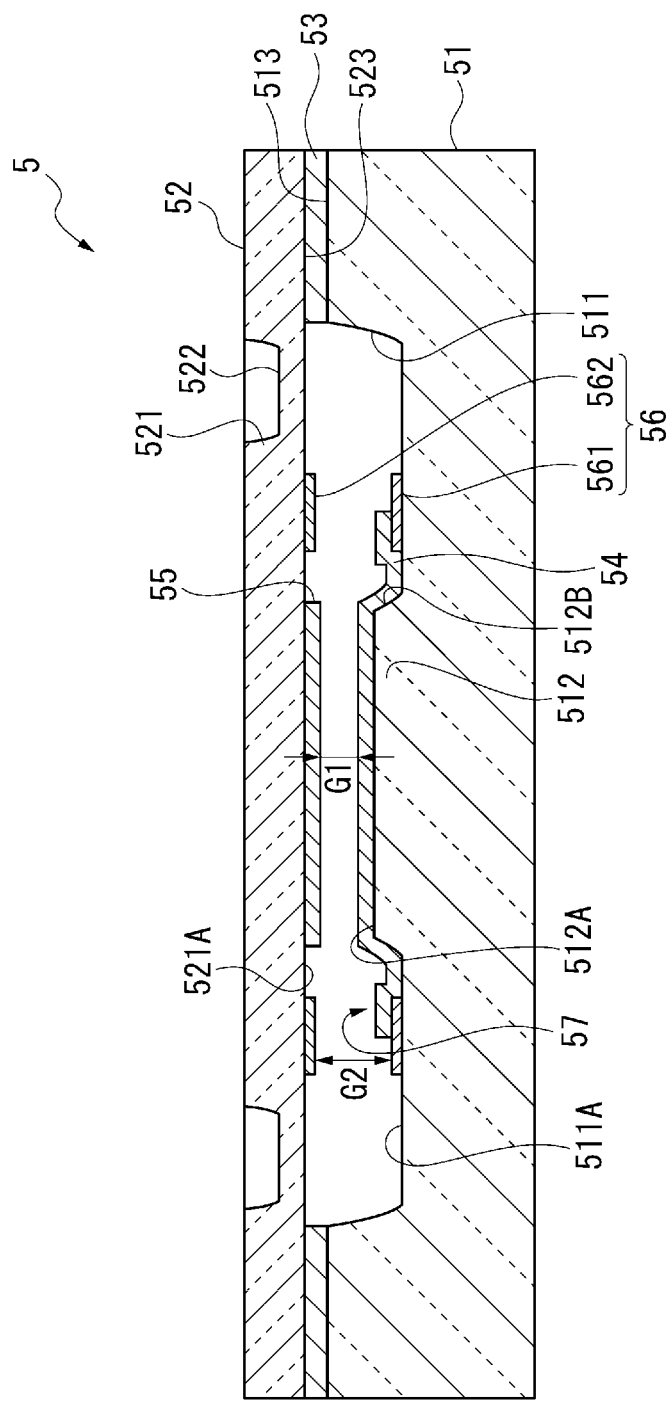
FIG. 3 is a sectional view of the tunable interference filter of the embodiment.

FIG. 2 is a plan view showing a schematic configuration of the tunable interference filter 5, and FIG. 3 is a sectional view showing the schematic configuration of the tunable interference filter 5.

The tunable interference filter 5 is a plate-like optical member having a square shape in a plan view as shown in FIG. 2. The tunable interference filter 5 includes a fixed substrate 51 (a first substrate) and a movable substrate 52 (a second substrate) as shown in FIG. 3. The fixed substrate 51 and the movable substrate 52 are formed using various kinds of glass of soda glass, crystalline glass, quartz glass, lead glass, potassium glass, borosilicate glass, alkali-free glass, or quartz. Further, the fixed substrate 51 and the movable substrate 52 are integrally formed, in which a first bonding surface 513 and a second bonding surface 523 formed near the outer peripheral parts are bonded using a bonding film 53 formed by a plasma-polymerized film mainly containing siloxane, for example.

A fixed reflection film 54 forming a first reflection film is provided on the fixed substrate 51 and a movable reflection film 55 forming a second reflection film is provided on the movable substrate 52. Here, the fixed reflection film 54 is fixed to the surface of the fixed substrate 51 facing the movable substrate 52, and the movable reflection film 55 is fixed to the surface of the movable substrate 52 facing the fixed substrate 51. Furthermore, the fixed reflection film 54 and the movable reflection film 55 are oppositely provided spaced across a gap G1 between the reflection films.

In addition, an electrostatic actuator 56 for adjustment of the dimension of the gap G1 between the reflection films between the fixed reflection film 54 and the movable reflection film 55 is provided in the tunable interference filter 5. The electrostatic actuator 56 has a fixed electrode 561 (a first electrode) provided at the fixed substrate 51 side and a movable electrode 562 (a second electrode) provided at the movable substrate 52 side. Here, the fixed electrode 561 and the movable electrode 562 may be provided directly on the substrate surfaces of the fixed substrate 51 and the movable substrate 52, respectively, or may be provided via another film member.

Further, in a plan view (hereinafter, referred to as "plan view of the filter") of the tunable interference filter 5 as shown in FIG. 2 as seen from a substrate thickness direction of the fixed substrate 51 (movable substrate 52), the planar center point O of the fixed substrate 51 and the movable substrate 52 coincides with the center points of the fixed reflection film 54 and the movable reflection film 55 and coincides with the center point of a movable part 521, which will be described later.

3-1-1. Configuration of Fixed Substrate

The fixed substrate 51 is formed by processing a glass base material formed in a thickness of 500 µm, for example. Specifically, on the fixed substrate 51, an electrode formation groove 511 and a reflection film fixing part 512 are formed by etching as shown in FIG. 3. In the fixed substrate 51, a thickness dimension is formed larger than that of the movable substrate 52, and there is no electrostatic attractive force when a voltage is applied between the fixed electrode 561 and the movable electrode 562 or deflection of the fixed substrate 51 due to internal stress of the fixed electrode 561.

The electrode formation groove 511 is formed in an annular shape around the planar center point O of the fixed substrate 51 in the plan view of the filter. The reflection film fixing part 512 is formed to project from the center part of the electrode formation groove 511 toward the movable substrate 52 side in a plan view. Here, a groove bottom surface of the electrode formation groove 511 is a fixed electrode surface 511A (a first electrode surface) and a projecting end surface of the reflection film fixing part 512 is a reflection film fixing surface 512A.

Further, three electrode lead grooves (not shown) extending from the electrode formation groove 511 toward the respective apexes C1, C2, C3 of the outer peripheral edge of the fixed substrate 51 are provided on the fixed substrate 51.

The fixed electrode 561 having the annular shape around the planar center point O is formed on a fixed electrode surface 511A of the fixed substrate 51. Here, it is more preferable that the fixed electrode 561 is formed in a circular ring shape. Further, the circular ring shape includes a configuration in which a fixed lead electrode 563 projects from a part of the circular ring shape, a configuration in which a part of the circular ring is lost, and a nearly C-shaped configuration in which a part of the circular ring is divided.

Note that insulating films (not shown) for preventing discharge between the fixed electrode 561 and the movable electrode 562 may be stacked on the fixed electrode 561.

Further, the fixed lead electrode 563 extending from the outer peripheral edge of the fixed electrode 561 is formed on the fixed substrate 51. Specifically, the fixed lead electrode 563 is formed from a location of the outer peripheral edge of the fixed electrode 561 nearest the apex C1 along the electrode formation groove extending in the direction toward the apex C1 to the apex C1. The end part of the fixed lead electrode 563 (the part located on the apex C1 of the fixed substrate 51) forms a fixed electrode pad 563P.

Furthermore, a first opposed electrode 581 and a second opposed electrode 582 are provided in the electrode lead grooves formed from the electrode formation groove 511 toward the apexes C2, C3 of the fixed substrate 51, respectively. The first opposed electrode 581 and the second opposed electrode 582 are insulated from the fixed electrode 561. The end parts of the first opposed electrode 581 and the second opposed electrode 582 (the parts located on the apexes C2, C3 of the fixed substrate 51) form a first opposed electrode pad 581P and a second opposed electrode pad 582P, respectively.

As described above, the reflection film fixing part 512 is formed in a nearly cylindrical shape having a diameter dimension smaller than that of the electrode formation groove 511 coaxially with the electrode formation groove 511, and the surface (projection end surface) of the reflection film fixing part 512 facing the movable substrate 52 is a reflection film fixing surface 512A.

Here, as described above, the reflection film fixing part 512 is formed to project from the electrode formation groove 511 toward the movable substrate 52 side. Therefore, the reflection film fixing surface 512A is located nearer the movable substrate 52 than the fixed electrode surface 511A. That is, in the embodiment, the dimension of the gap G2 between electrodes is formed larger than the dimension of the gap G1 between the reflection films.

Further, the electrode formation groove 511 and the reflection film fixing part 512 are formed by etching (wet etching) one surface side of the fixed substrate 51, and thus, an outer circumference side surface 512B of the reflection film fixing part 512 is not parallel to the substrate thickness direction of the fixed substrate 51, but has a curved shape gently curved from the reflection film fixing surface 512A toward the fixed electrode surface 511A.

Furthermore, the fixed reflection film 54 is formed to cover the reflection film fixing surface 512A, the outer circumference side surface 512B, and the inner circumference part of the ring-shaped fixed electrode 561 provided on the fixed electrode surface 511A. Here, the part in which the fixed reflection film 54 and the fixed electrode 561 are stacked forms a layered part 57. The fixed reflection film 54 is formed in a circular shape around the planar center point O in the plan view of the filter as shown in FIG. 2. Therefore, the layered part 57 has a ring shape along a virtual circle around the planar center point O.

As the fixed reflection film 54, a conductor material may be used. As a conductor material film, for example, a single-layer film of Ag or Ag alloy may be used. In the case of a dielectric multilayer film, for example, a dielectric multilayer film with a high-refractive-index layer of $TiO_2$ and a low-refractive-index layer of $SiO_2$ may be used.

The fixed reflection film 54 is in surface contact with the fixed electrode 561 by the layered part 57 and electric conduction with the fixed electrode 561. Thereby, even when the fixed reflection film 54 is charged, the accumulated charge can be released to the fixed electrode 561. Further, in the case where a film formed by stacking a dielectric film as an insulator and a multilayer film thereof on a metal film is used as the fixed reflection film 54, the metal film and the fixed electrode 561 have direct contact and electric conduction at least in the surface contact part with the fixed electrode 561 in the layered part 57. Thereby, even when the fixed reflection film 54 is charged, the charge accumulated near the metal film and the interface between the metal film and the insulating film can be released to the fixed electrode 561.

Further, in the fixed substrate 51, an anti-reflection film (not shown) is formed in a location corresponding to the fixed reflection film 54 on the opposite surface to the movable substrate 52. The anti-reflection film is formed by alternately stacking a low-refractive-index film and a high-refractive-index film for reducing reflectance and increasing transmittance of visible light on the surface of the fixed substrate 51.

3-1-2. Configuration of Movable Substrate

The movable substrate 52 is formed by processing a glass base material formed in a thickness of 200 μm, for example, by etching.

Specifically, the movable substrate 52 includes a movable part 521 having a circular shape around the planar center point O and a holding part 522 that is coaxial with the movable part 521 and holds the movable part 521 in the plan view of the filter as shown in FIG. 2.

Further, the movable substrate 52 has cutout parts 524 in correspondence with the respective apexes C1, C2, C3 of the fixed substrate 51, and the fixed electrode pad 563P, the first opposed electrode pad 581P, and the second opposed electrode pad 582P are exposed on the surface of the tunable interference filter 5 as seen from the movable substrate 52 side as shown in FIG. 2.

The movable part 521 is formed to have a thickness dimension larger than that of the holding part 522, and, for example, in the embodiment, formed to have the same dimension of 200 μm as the thickness dimension of the movable substrate 52. Further, the movable part 521 is formed to have at least a larger radial dimension than the radial dimension of the outer peripheral edge of the fixed electrode 561. The surface of the movable part 521 facing the fixed substrate 51 is a movable surface 521A parallel to the reflection film fixing surface 512A, and the movable reflection film 55 opposed to the fixed reflection film 54 via the gap G1 between the reflection films and the movable electrode 562 opposed to the fixed electrode 561 via the gap G2 between electrodes are fixed to the movable surface 521A.

For the movable reflection film 55, a reflection film having the same configuration as that of the above described fixed reflection film 54 is used. Further, a reflection film connection electrode 551 extending from the outer peripheral edge of the movable reflection film 55 is formed on the movable substrate 52. The reflection film connection electrode 551 is formed from a location of the outer peripheral edge of the movable reflection film 55 nearest the apex C2 toward the apex C2. As the reflection film connection electrode 551, an electrode having conductivity may be used. If the movable reflection film 55 is made of a conducting metal such as a silver alloy, for example, the same material as that of the movable reflection film 55 may be used and the reflection film connection electrode 551 may be patterned at formation of the movable reflection film 55. Further, a member that is different from the movable reflection film 55 may be used, and, in this case, the reflection film connection electrode 551 is formed by the same material as that of the movable electrode 562, for example, and thus, the reflection film connection electrode 551 may be patterned at formation of the movable electrode 562.

Further, the reflection film connection electrode 551 is electrically connected to the first opposed electrode 581 (first opposed electrode pad 581P) formed in the location of the apex C2 of the fixed substrate 51 near the outer peripheral edge of the movable substrate 52 by a conducting member 58 of Ag paste or the like, for example. Thereby, the charge of the movable reflection film 55 can be eliminated from the first opposed electrode pad 581P located on the apex C2 of the fixed substrate 51.

The movable electrode 562 provided on the movable surface 521A is formed in a region overlapping with the fixed electrode 561 and in a C shape having a part corresponding to the apex C2 opening in a plan view of the filter. The reflection film connection electrode 551 is formed toward the apex C2 in the C-shaped opening part. Further, the width dimension of the movable electrode 562 is formed in the same dimension as the ring width dimension (the difference between the radius of the inner circumferential edge and the radius of the outer circumferential edge) of the fixed electrode 561.

Further, a movable lead electrode 564 extending from the outer circumferential edge of the movable electrode 562 is formed on the movable substrate 52. The movable lead electrode 564 extends from a location of the movable electrode 562 nearest the apex C3 toward the apex C3. The movable lead electrode 564 is electrically connected to the second opposed electrode 582 (second opposed electrode pad 582P) formed in the location of the apex C3 of the fixed substrate 51 near the outer peripheral edge of the movable substrate 52 by a conducting member of Ag paste or the like, for example.

Furthermore, in the movable part 521, an anti-reflection film (not shown) is formed on the opposite surface to the fixed substrate 51. The anti-reflection film has the same configuration as that of the anti-reflection film formed on the fixed substrate 51 and is formed by alternately stacking a low-refractive-index film and a high-refractive-index film.

The holding part 522 is a diaphragm surrounding the movable part 521, and formed in a thickness dimension of 50 µm, for example, and having a stiffness that is smaller than that of the movable part 521 in the thickness direction.

Accordingly, the holding part 522 is more likely to deflect than the movable part 521, and may be deflected toward the fixed substrate 51 side by a small electrostatic attractive force. In this regard, since the movable part 521 has a larger thickness dimension and larger stiffness than those of the holding part 522, even when a force of deflecting the movable substrate 52 acts thereon by the electrostatic attractive force, there is little deflection of the movable part 521 and the deflection of the movable reflection film 55 formed in the movable part 521 may be prevented.

Note that, although the holding part 522 having the diaphragm shape is exemplified in the embodiment, the shape is not so limited. For example, a holding part having beam shapes provided at equal angular intervals around the planar center point O may also be employed.

3-2. Configuration of Voltage Control Unit

The voltage control unit 32 is connected to the fixed electrode pad 563P, the first opposed electrode pad 581P, and the second opposed electrode pad 582P, sets the fixed electrode pad 563P, the first opposed electrode pad 581P, and the second opposed electrode pad 582P at predetermined potentials based on the control signal input from the control unit 4, and thereby, applies a voltage to the electrostatic actuator 56 for driving.

Specifically, the voltage control unit 32 grounds the first opposed electrode pad 581P and the fixed electrode pad 563P, and sets a potential for setting the gap G1 between the reflection films to a predetermined dimension for the second opposed electrode pad 582P. Thereby, a voltage is applied between the fixed electrode 561 connected to the fixed electrode pad 563P and the movable electrode 562 connected to the second opposed electrode pad 582P, the movable part 521 moves to the fixed substrate 51 side by the electrostatic attractive force, and the dimension of the gap G1 between the reflection films is set to a predetermined value. In this regard, both the first opposed electrode pad 581P and the fixed electrode pad 563P are grounded, and thus, even when the fixed reflection film 54 and the movable reflection film 55 are charged, the charge may be released and no electrostatic attractive force acts between the fixed reflection film 54 and the movable reflection film 55. Therefore, for setting the gap G1 between the reflection films, the gap G1 between the reflection films may be set to a desired target value with high accuracy only by setting the voltage between the fixed electrode 561 and the movable electrode 562 without consideration of the electrostatic attractive force acting between the fixed reflection film 54 and the movable reflection film 55.

Note that, in the embodiment, the first opposed electrode pad 581P and the fixed electrode pad 563P are grounded, however, a configuration in which a predetermined potential can be set may be employed. In this case, the potential difference between the set potential of the second opposed electrode pad 582P and the set potential of the fixed electrode pad 563P is applied to the electrostatic actuator 56 as a drive voltage, and thereby, the dimension of the gap G1 between the reflection films may be controlled. Further, in this case, by setting the first opposed electrode pad 581P and the fixed electrode pad 563P at the same potential, the fixed reflection film 54 and the movable reflection film 55 may be at the same potential and the electrostatic attractive force in the gap G1 between the reflection films may be eliminated.

Further, the voltage control unit 32 may ground the second opposed electrode pad 582P and set potentials for driving the electrostatic actuator 56 for the first opposed electrode pad 581P and the fixed electrode pad 563P. In this case, the voltage control unit 32 may drive the electrostatic actuator 56 by the applied voltage based on the potentials set for the first opposed electrode pad 581P and the fixed electrode pad 563P. In addition, the same potential is set for the first opposed electrode pad 581P and the fixed electrode pad 563P, and thereby, no electrostatic attractive force acts between the fixed reflection film 54 and the movable reflection film 55, and the gap G1 between the reflection films may be controlled with high accuracy by the potential set for the first opposed electrode pad 581P and the fixed electrode pad 563P.

4. Configuration of Control Unit

The control unit 4 controls the operation of the colorimetric instrument 1.

As the control unit 4, for example, a general-purpose personal computer, a portable information terminal, and additionally, a colorimetry-dedicated computer or the like may be used.

Further, the control unit 4 includes a light source control part 41, a colorimetric sensor control part 42, a colorimetric processing part 43 (an analytical processing unit) as shown in FIG. 1.

The light source control part 41 is connected to the light source unit 2. Further, the light source control part 41 outputs a predetermined control signal to the light source unit 2 based on the setting input by a user, for example, and allows the light source unit 2 to output white light with predetermined brightness.

The colorimetric sensor control part 42 is connected to the colorimetric sensor 3. Further, the colorimetric sensor control part 42 sets the wavelength of light to be received by the colorimetric sensor 3 based on the setting input by the user, for example, and outputs a control signal for detecting the amount of received light having the wavelength to the colorimetric sensor 3. Thereby, the voltage control unit 32 of the colorimetric sensor 3 sets the voltage applied to the electrostatic actuator 56 so that only the wavelength of the light desired by the user may be transmitted based on the control signal.

The colorimetric processing part 43 analyzes the chromaticity of the test object A from the amount of received light detected by the detection unit 31.

5. Advantages of Embodiment

As described above, in the tunable interference filter 5 according to the embodiment, the fixed substrate 51 has the fixed electrode surface 511A and the reflection film fixing surface 512A at different distances from the movable substrate 52, and the fixed electrode 561 is provided on the fixed electrode surface 511A, and the fixed reflection film 54 is provided from the reflection film fixing surface 512A over part of the fixed electrode surface 511A. Further, the outer circumference part of the fixed reflection film 54 is stacked on the inner circumference part of the fixed electrode 561, and the stacked structure forms the layered part 57. Accordingly, in the layered part 57, the fixed reflection film 54 and the fixed electrode 561 have surface contact and the fixed reflection film 54 and the fixed electrode 561 are electrically connected, and, even when the fixed reflection film 54 is charged, the charge may be released from the fixed electrode 561. Therefore, the generation of electrostatic force by the charging the fixed reflection film 54 and the movable reflection film 55 may be prevented, and adjustment of the dimension of the gap G1 between the reflection films by the voltage control unit 32 may easily be performed with high accuracy.

In this regard, in the layered part 57, by the surface contact between the fixed reflection film 54 and the fixed electrode 561, conduction between the fixed reflection film 54 and the fixed electrode 561 may reliably be secured, and the charge of the fixed reflection film 54 may be released to the fixed electrode 561. Further, the thickness dimension of the layered part 57 becomes larger than those of the fixed reflection film 54 and the fixed electrode 561 by stacking the fixed reflection film 54 and the fixed electrode 561. However, the layered part 57 is provided on the fixed electrode surface 511A at a larger distance from the movable substrate 52, and thus, the variable range of the gap G1 between the reflection films may not be hindered by the thickness of the layered part 57 and the variable region of the gap G1 between the reflection films may sufficiently be secured.

Further, in the fixed substrate 51, the reflection film fixing surface 512A is formed to project from the fixed electrode surface 511A toward the movable substrate 52 side and the dimension of the gap G2 between electrodes is larger than the dimension of the gap G1 between the reflection films. Accordingly, the variable region of the gap G1 between the reflection films may be made larger, and the measurable wavelength range of the colorimetric instrument 1 may be made wider. In addition, the control of the electrostatic attractive force between the fixed electrode 561 and the movable electrode 562 may be easier and the dimension of the gap G1 between the reflection films may be set to a desired value with higher accuracy.

Furthermore, in the layered part 57, the fixed reflection film 54 is stacked on the fixed electrode 561. During manufacturing, the tunable interference filter 5 may be easily formed by depositing the fixed electrode 561, and then, depositing the fixed reflection film 54. Since the fixed reflection film 54 is formed after the fixed electrode 561, damage of the fixed reflection film 54 during manufacturing may be suppressed.

In addition, the reflection film connection electrode 551 is connected to the movable reflection film 55 and the reflection film connection electrode 551 is connected to the voltage control unit 32 from the first opposed electrode pad 581P and grounded. Accordingly, even when the movable reflection film 55 is charged, the charge may be released from the reflection film connection electrode 551 and generation of the electrostatic force between the fixed reflection film 54 and the movable reflection film 55 may be prevented more reliably.

Further, the potential set for the first opposed electrode pad 581P and the fixed electrode pad 563P is not limited to the zero potential as long as the first opposed electrode pad 581P and the fixed electrode pad 563P are at the same potential by the voltage control unit 32. In this case, the fixed reflection film 54 and the movable reflection film 55 are at the same potential, and the generation of electrostatic attractive force between the fixed reflection film 54 and the movable reflection film 55 may be prevented.

Modifications of Embodiment

Note that the invention is not limited to the above described embodiment, but includes modifications, improvements, and the like within the range in which the purpose of the invention may be achieved.

Figure 4:
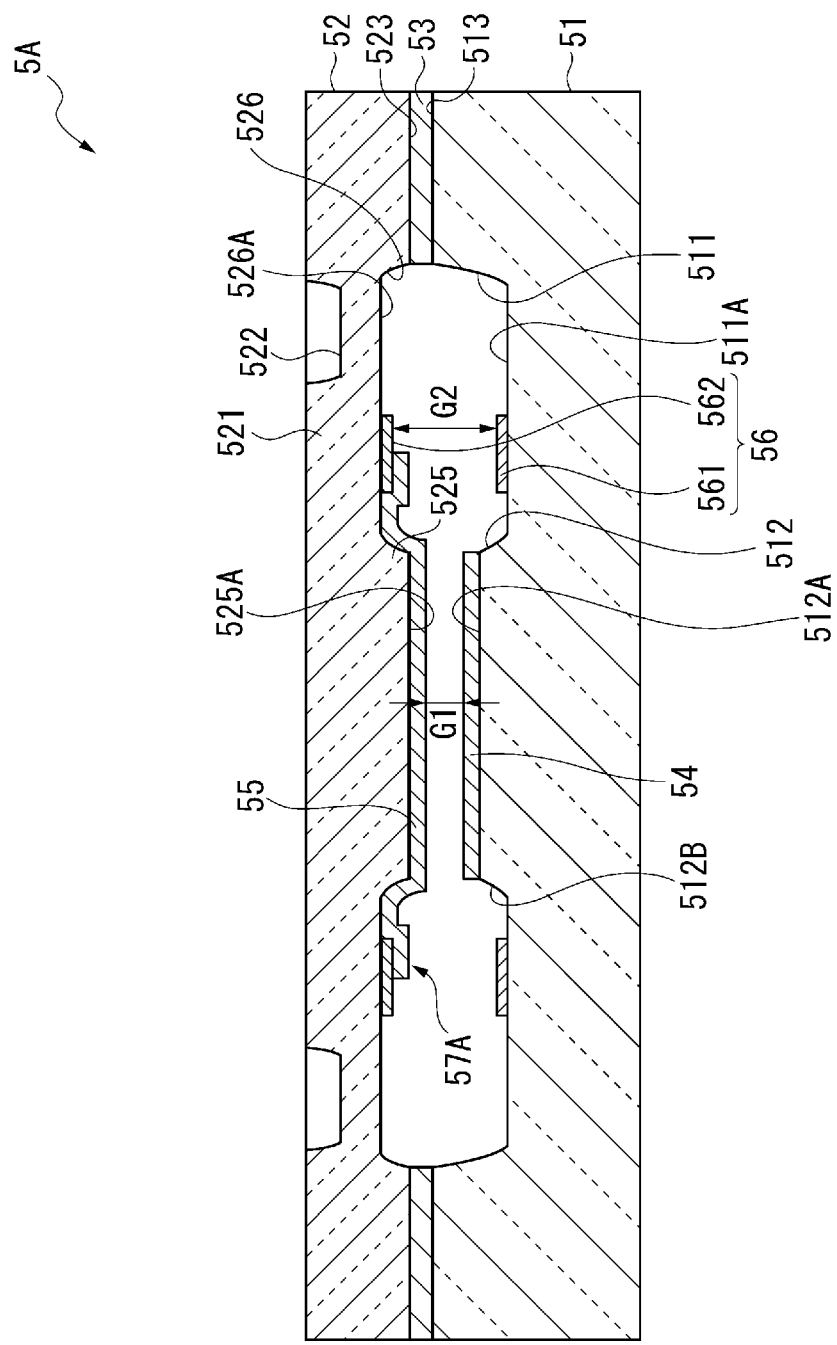
FIG. 4 is a sectional view showing a schematic configuration of a tunable interference filter of another embodiment.

For example, in the embodiment, the example in which the first substrate is the fixed substrate 51 and the fixed electrode surface 511A and the reflection film fixing surface 512A formed in different height locations are provided on the fixed substrate 51 has been shown, however, a configuration with the first substrate as the movable substrate 52 as shown in FIG. 4 may be employed.

FIG. 4 is a sectional view showing a schematic configuration of a tunable interference filter 5A in another embodiment.

As shown in FIG. 4, the tunable interference filter 5A includes the fixed substrate 51 and the movable substrate 52.

The fixed substrate 51 includes the electrode formation groove 511 having the fixed electrode surface 511A and the reflection film fixing part 512 having the reflection film fixing surface 512A. Here, unlike the above described embodiment, the fixed electrode 561 and reflection film 54 are independently provided on the fixed electrode surface 511A and the reflection film fixing surface 512A, respectively. Further, although not illustrated, the fixed electrode 561 is formed in a nearly C-shape in the plan view of the filter, and the reflection film connection electrode connected to the fixed reflection film 54 is formed to extend toward the apex of the colorimetric instrument 1 of the fixed substrate 51 (for example, the apex C2 in FIG. 2) in the C-shaped opening part.

On the other hand, the movable substrate 52 has a projection part 525 projecting from the movable part 521 toward the fixed substrate 51 side and an electrode formation concave part 526. Here, the projection end surface (projection surface 525A) of the projection part 525 forms a first reflection film fixing surface, a bottom surface 526A of the electrode formation concave part 526 forms a first electrode surface, and a distance of the bottom surface 526A from the fixed substrate 51 is formed larger than that of the projection surface 525A.

Further, the movable electrode 562 opposed to the fixed electrode 561 via the gap G2 between electrodes is provided in a location overlapping with the fixed electrode 561 in the plan view of the filter. Furthermore, the movable reflection film 55 opposed to the fixed reflection film 54 via the gap G1 between the reflection films is provided on the projection surface 525A, and the movable reflection film 55 is provided from the projection surface 525A over a part of the bottom surface 526A. The outer circumference part of the movable reflection film 55 is stacked on the inner circumference part of the movable electrode 562 and forms a layered part 57A.

In the tunable interference filter 5A, like the above described tunable interference filter 5, even when the movable reflection film 55 is charged, the charge may be released to the movable electrode 562. Further, even when the fixed reflection film 54 is charged, the charge may be released by the reflection film connection electrode. Therefore, no electrostatic attractive force acts between the fixed reflection film 54 and the movable reflection film 55, and the dimension of the gap G1 between the reflection films may be set with high accuracy by controlling the voltage applied between the fixed electrode 561 and the movable electrode 562.

Figure 5:
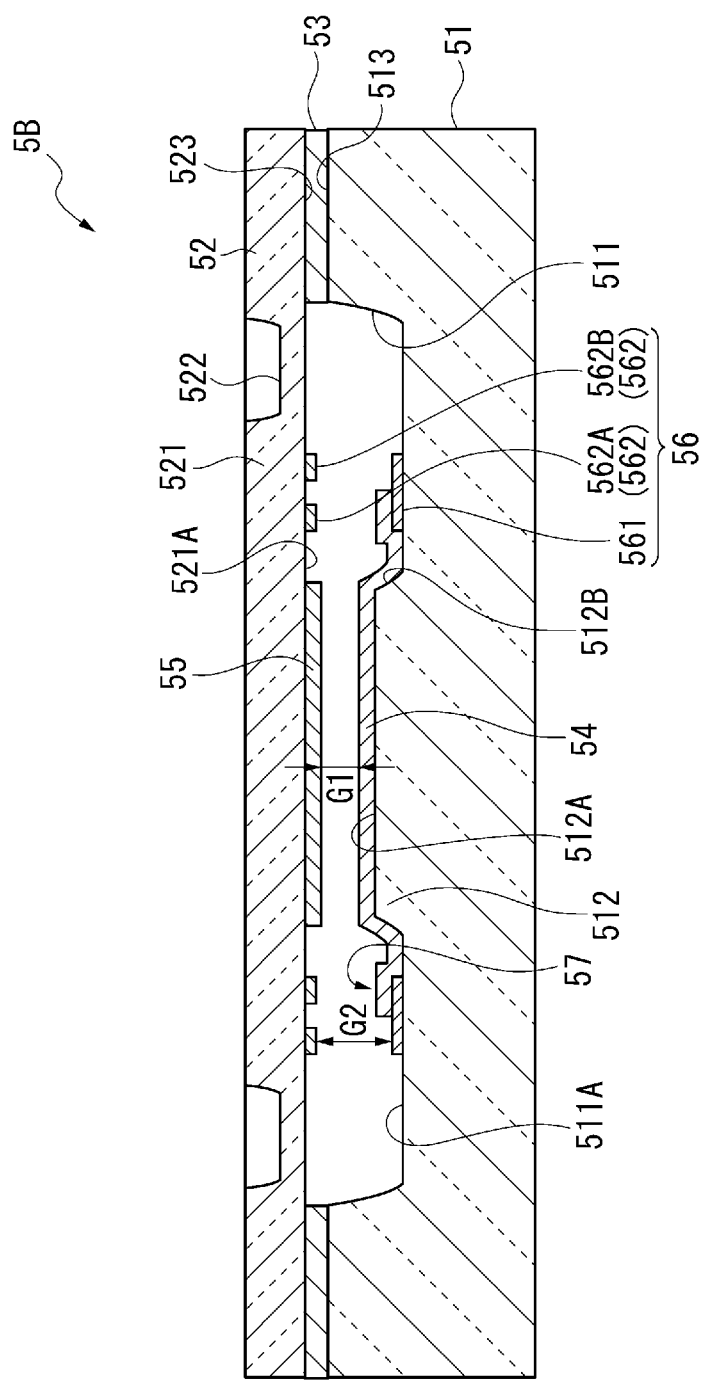
FIG. 5 is a sectional view showing a schematic configuration of a tunable interference filter of another embodiment.

Further, in the embodiment and the example shown in FIG. 4, the example in which the pair of opposed electrodes (the fixed electrode 561 and the movable electrode 562) form the electrostatic actuator 56 has been shown, however, as shown in FIG. 5, a configuration in which plural electrodes form the electrostatic actuator 56 may be employed. FIG. 5 is a sectional view showing a schematic configuration of a tunable interference filter 5B of another embodiment.

In the tunable interference filter 5B shown in FIG. 5, an inner movable electrode 562A and an outer movable electrode 562B form the movable electrode 562. In the tunable interference filter 5B, by individually controlling the voltage applied between the inner movable electrode 562A and the fixed electrode 561 and the voltage applied between the outer movable electrode 562B and the fixed electrode 561, the amount of displacement of the movable part 521 may be set with higher accuracy.

Further, in the embodiment, as shown in FIG. 3, the example in which the reflection film fixing surface 512A of the reflection film fixing part 512 opposed to the movable substrate 52 is located nearer the movable substrate 52 than the fixed electrode surface 511A and the dimension of the gap G2 between electrodes is larger than the gap G1 between the reflection films has been shown, however, the configuration is not so limited. The height locations of the fixed electrode surface 511A and the reflection film fixing surface 512A may be appropriately set depending on the wavelength range of the light to be transmitted by the tunable interference filter 5 (measurement wavelength range), i.e., the variable range of the gap G1 between the reflection films, the dimension of the gap G2 between electrodes, the thickness dimensions of the fixed reflection film 54 and the movable reflection film 55. Therefore, for example, a configuration in which a reference film fixing groove having a cylindrical recessed groove shape is formed in the center part of the fixed electrode surface 511A and a reference film fixing surface is formed on the bottom surface of the reference film fixing groove may be employed. In this case, the layered part 57 in which the fixed reflection film 54 and the fixed electrode 561 are stacked is provided in the bottom surface part of the reference film fixing groove at the larger distance from the movable substrate 52, and thereby, the inconvenience that the variable amount of the gap G2 between electrodes is restricted by the thickness dimension of the layered part 57 may be avoided.

Further, in the embodiment, the fixed electrode 561 forming the electrostatic actuator 56 has been exemplified as the first electrode, however, the configuration is not so limited. For example, a charge elimination electrode for eliminating the charge of the fixed reflection film 54 may be formed on the fixed electrode surface 511A of the fixed substrate 51 and the fixed reflection film 54 may be stacked on the charge elimination electrode for eliminating the charge.

Furthermore, in the example shown in FIG. 4, the fixed reflection film 54 is connected to the reflection film connection wire (not shown) and the charge is eliminated from the reflection film connection wire, however, for example, a configuration in which a charge elimination electrode is formed on the fixed electrode surface 511A of the fixed substrate 51 and the fixed reflection film 54 is stacked on the charge elimination electrode may be employed. In this case, a layered structure of the charge elimination electrode and the fixed reflection film 54 is formed on the fixed electrode surface 511A at the larger distance from the movable substrate 52 than the reflection film fixing surface 512A and the variable range of the gap G1 between the reflection films does not become narrower by the thickness of the layered structure, and the charge may be released more reliably even when the fixed reflection film 54 is charged by surface contact between the charge elimination electrode and the fixed reflection film 54.

In the embodiment and the examples shown in FIGS. 4 and 5, the configuration in which the gap G2 between electrodes is larger than the gap G1 between the reflection films has been exemplified, however, for example, a configuration in which the gap G2 between electrodes is smaller than the gap G1 between the reflection films may be employed. In this case, the variable range of the gap G1 between the reflection films is restricted by the gap G2 between electrodes, however, the restriction is not problematic when a sufficient dimension is secured for the wavelength range to be measured. Note that, as described above, the electrostatic attractive force is larger in inverse proportion to the square of distance, and, as the distance of the gap G2 between electrodes is smaller, the control of the gap G1 between the reflection films becomes difficult.

Further, the layered part 57 has been formed by stacking the fixed reflection film 54 on the fixed electrode 561, however, a configuration in which the fixed electrode 561 is stacked on the fixed reflection film 54 may be employed.

In this case, if a material that easily deteriorates such as a silver alloy is used as a fixed reflection film 54, for example, deterioration may occur during formation of the fixed electrode 561 after formation of the fixed reflection film 54. For example, by masking the formed fixed reflection film 54 or otherwise, the number of steps increases, but the deterioration may be suppressed. Further, in the case where the fixed reflection film 54 is deteriorated, the deterioration usually progresses from the outer circumferential edge, however, in the configuration in which the outer circumferential edge of the fixed reflection film 54 is covered by the fixed electrode 561, the progress of deterioration of the fixed reflection film 54 may be suppressed.

The colorimetric instrument 1 has been exemplified as an electronic apparatus according to the invention, however, the tunable interference filter, the optical module, and an electronic apparatus according to the invention may be used in other various fields.

For example, they may be used as a light-based system for detecting the presence of a specific material. As the system, for example, a gas detector such as a vehicle-mounted gas leak detector that detects a specific gas with high sensitivity by employing a spectroscopic measurement method using the tunable interference filter according to the invention or a photoacoustic gas detector for a breath test may be exemplified.

Below, an example of the gas detector will be explained according to the drawings.

Figure 6:
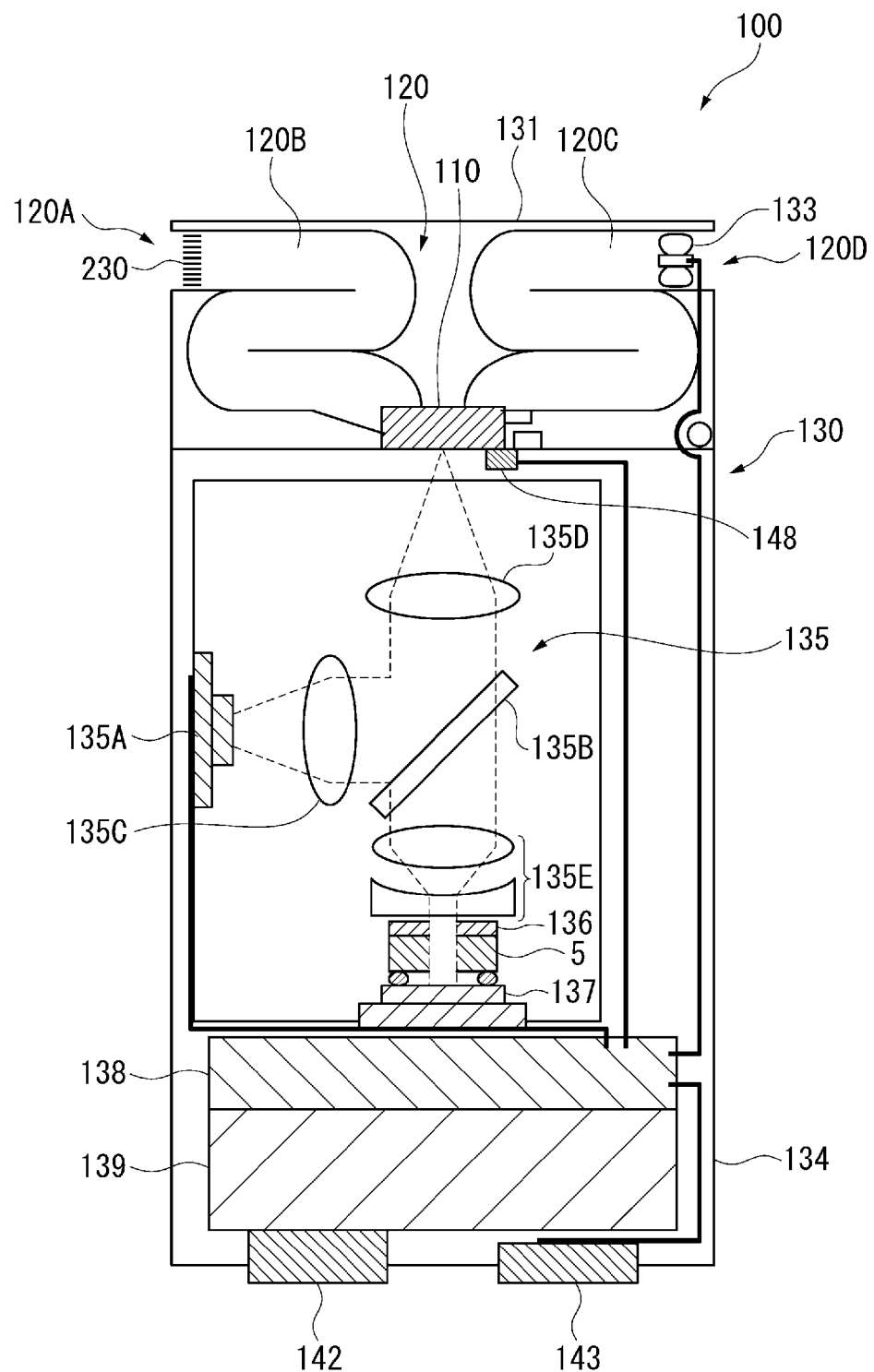
FIG. 6 is a schematic diagram of a gas detector as another example of an electronic apparatus according to the invention.

FIG. 6 is a schematic diagram showing an example of a gas detector including the tunable interference filter.

Figure 7:
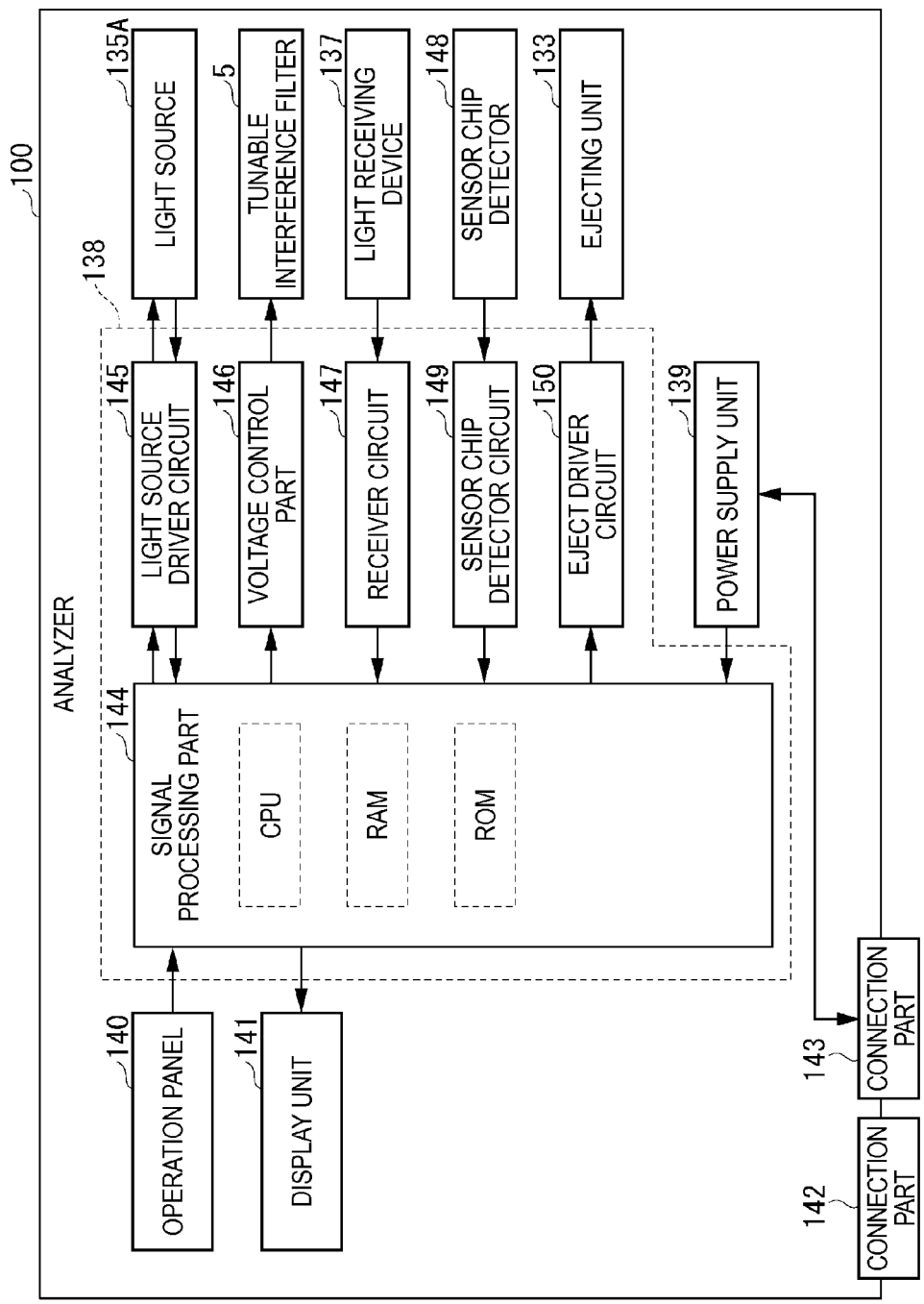
FIG. 7 is a block diagram of the gas detector in FIG. 6.

FIG. 7 is a block diagram showing a configuration of a control system of the gas detector in FIG. 6.

This gas detector 100 includes a sensor chip 110, a channel 120 having a suction port 120A, a suction channel 120B, an eject channel 120C, and an eject port 120D, and a main body part 130 as shown in FIG. 6.

The main body part 130 includes a detector (optical module) having a sensor part cover 131 having an opening in which the channel 120 is detachable, an ejecting unit 133, a housing 134, an optical unit 135, a filter 136, the tunable interference filter 5, a light receiving device 137 (detection unit), a control unit 138 that processes a detected signal and controls the detection unit, a power supply unit 139 that supplies power, and the like. Further, the optical unit 135 includes a light source 135A that outputs light, a beam splitter 135B that reflects the light entering from the light source 135A toward the sensor chip 110 side and transmits the light entering from the sensor chip side to the light receiving device 137 side, and lenses 135C, 135D, 135E. Although the configuration using the tunable interference filter 5 is exemplified, configurations using the above described tunable interference filters 5A, 5B may be employed.

Further, as shown in FIG. 7, on the surface of the gas detector 100, an operation panel 140, a display unit 141, a connection part 142 for interface with the outside, and the power supply unit 139 are provided. If the power supply unit 139 is a secondary cell, a connection part 143 for charging may be provided.

Furthermore, as shown in FIG. 7, the control unit 138 of the gas detector 100 includes a signal processing part 144 having a CPU, a light source driver circuit 145 for control of the light source 135A, a voltage control part 146 for control of the tunable interference filter 5, a receiver circuit 147 that receives a signal from the light receiving device 137, a sensor chip detector circuit 149 that receives a signal from a sensor chip detector 148 that detects presence or absence of the sensor chip 110, an eject driver circuit 150 that controls the ejecting unit 133, and the like.

Next, an operation of the gas detector 110 will be explained.

Inside of the sensor part cover 131 in the upper part of the main body part 130, the sensor chip detector 148 is provided and presence or absence of the sensor chip 110 is detected by the sensor chip detector 148. When the signal processing part 144 detects the detection signal from the sensor chip detector 148, the part determines that the state in which the sensor chip 110 is mounted, and outputs a display signal to the display unit 141 for displaying that a detection operation can be performed.

Then, for example, if the operation panel 140 is operated by a user and an instruction signal of starting detection processing is output from the operation panel 140 to the signal processing part 144, first, the signal processing part 144 outputs a signal of light source activation to the light source driver circuit 145 and activates the light source 135A. When the light source 135A is driven, a stable laser beam of linearly-polarized light having a single waveform is output from the light source 135A. Further, a temperature sensor and a light amount sensor are contained in the light source 135A, and their information is output to the signal processing part 144. Then, if the signal processing part 144 determines that the light source 135A is in stable operation based on the temperature and the light amount input from the light source 135A, the part controls the eject driver circuit 150 to activate the ejecting unit 133. Thereby, a gas sample containing a target material (gas molecules) to be detected is guided from the suction port 120A into the suction channel 120B, the sensor chip 110, the eject channel 120C, and the eject port 120D.

The sensor chip 110 has plural metal nanostructures incorporated therein and uses localized surface plasmon resonance. In the sensor chip 110, when enhanced electric fields are formed between the metal nanostructures by the laser beam and the gas molecules enter the enhanced electric fields, Raman scattering light and Rayleigh scattering light containing information of molecule oscillation are generated.

The Raman scattering light and Rayleigh scattering light enter the filter 136 through the optical unit 135, the Rayleigh scattering light is separated by the filter 136, and the Raman scattering light enters the tunable interference filter 5. Then, the signal processing part 144 controls the voltage control part 146 to adjust the voltage applied to the tunable interference filter 5 and allow the tunable interference filter 5 to spectroscopically separate the Raman scattering light in response to the gas molecules to be detected. Then, when the spectroscopically separated light is received by the light receiving device 137, the light reception signal in response to the amount of received light is output to the signal processing part 144 via the receiver circuit 147.

The signal processing part 144 compares spectrum data of the Raman scattering light in response to the gas molecules to be detected obtained in the above described manner and data stored in a ROM, determines whether or not they are the target gas molecules, and identifies the material. Further, the signal processing part 144 allows the display unit 141 to display the result information and outputs it to the outside from the connection part 142.

In FIGS. 6 and 7, the gas detector 100 that performs gas detection from the spectroscopic separated Raman scattering light by spectroscopic separation of the Raman scattering light using the tunable interference filter 5 has been exemplified, however, it may be used as a gas detector that identifies a gas type by detecting absorbance unique to the gas. In this case, a gas sensor that takes a gas inside and detects light absorbed by the gas of the incident lights is used as the optical module according to the invention. Further, a gas detector that analyzes and discriminates the gas flowing into the sensor using the gas sensor is an electronic apparatus according to the invention. The configuration may even detect components of the gas using the tunable interference filter according to the invention.

Further, as a system for detection of the presence of a specific material, not limited to the gas detection, but also a material component analyzer such as a non-invasive measurement device of sugar using near-infrared spectroscopy or a non-invasive measurement device of information of foods, living organisms, minerals, or the like may be exemplified.

Below, a food analyzer as an example of the material component analyzer will be explained.

Figure 8:
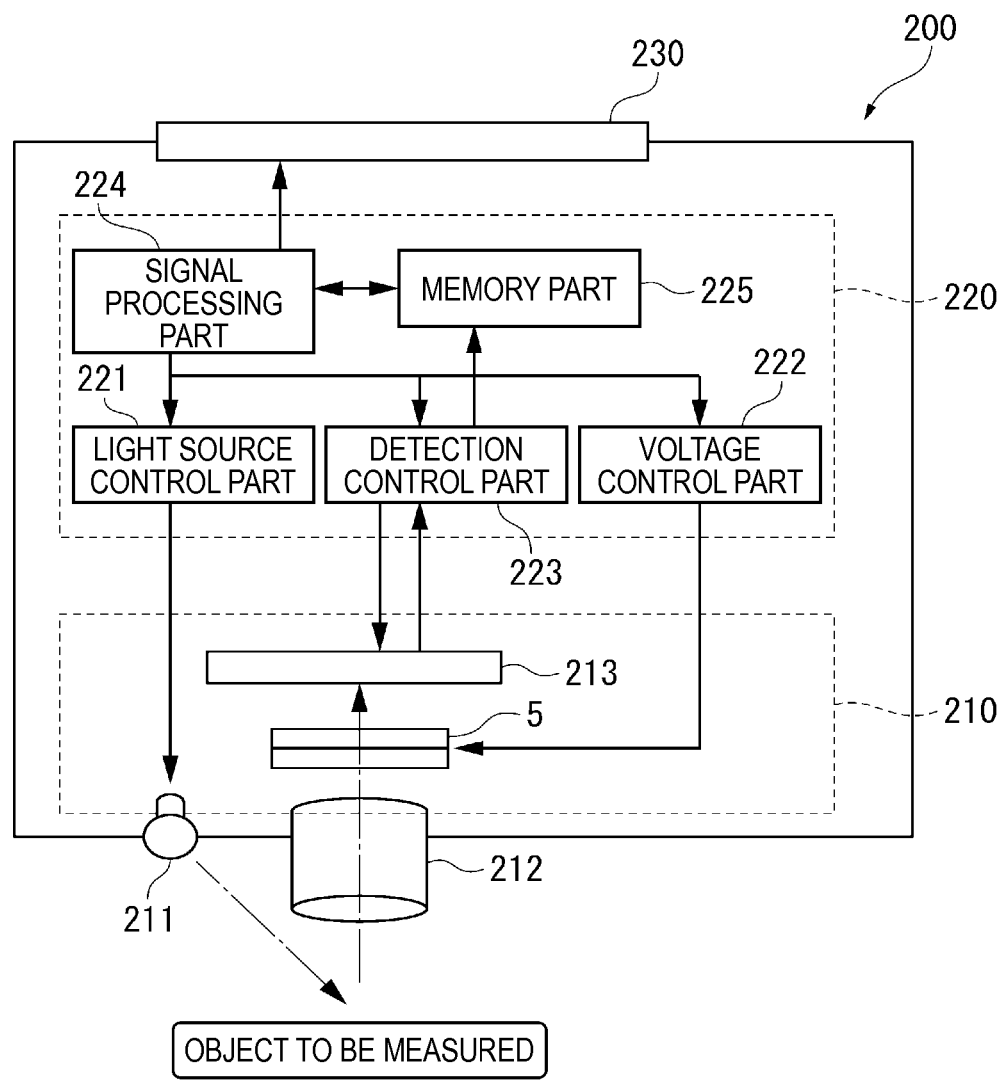
FIG. 8 is a block diagram showing a configuration of a food analyzer as another example of the electronic apparatus according to the invention.

FIG. 8 shows a schematic configuration of a food analyzer as an example of an electronic apparatus using the tunable interference filter 5. Here, the tunable interference filter 5 is used, however, the tunable interference filters 5A, 5B may be used.

As shown in FIG. 8, this food analyzer 200 includes a detector 210 (optical module), a control unit 220, and a display unit 230. The detector 210 includes a light source 211 that outputs light, an imaging lens 212 that introduces light from an object to be measured, the tunable interference filter 5 that spectroscopically separates the light introduced from the imaging lens 212, and an imaging unit 213 (detection unit) that detects the spectroscopically separated light.

Further, the control unit 220 includes a light source control part 221 that performs turn-on and turn-off control and brightness control when the light source 211 is turned on, a voltage control part 222 that controls the tunable interference filter 5, a detection control part 223 that controls the imaging unit 213 and acquires spectroscopically separated images imaged by the imaging unit 213, a signal processing part 224, and a memory part 225.

In the food analyzer 200, when the system is driven, the light source 211 is controlled by the light source control part 221, and the object to be measured is irradiated with light from the light source 211. Then, the light reflected by the object to be measured passes through the imaging lens 212 and enters the tunable interference filter 5. A voltage that enables spectroscopic separation of a desired wavelength is applied to the tunable interference filter 5 under the control of the voltage control part 222, and the spectroscopically separated light is imaged in the imaging unit 213 including a CCD camera, for example. Further, the imaged light is accumulated as spectroscopically separated images in the memory part 225. Furthermore, the signal processing part 224 controls the voltage control part 222 to change the voltage value applied to the tunable interference filter 5, and acquires the spectroscopically separated images for the respective wavelengths.

Then, the signal processing part 224 performs computation processing on data of respective pixels in the respective images accumulated in the memory part 225, and obtains spectra in the respective pixels. Further, for example, information on components of foods with respect to the spectra is stored in the memory part 225. The signal processing part 224 analyzes the data of the obtained spectra based on the information on the foods stored in the memory part 225, and obtains food components contained in the object to be detected and their contents. Further, from the obtained food components and contents, food calories, freshness, and the like may be calculated. Furthermore, by analyzing the spectrum distributions within the images, extraction of a part in which freshness has been deteriorated in the food of the object to be inspected or the like may be performed, and detection of foreign materials contained within the foods or the like may be performed.

Then, the signal processing part 224 performs processing to allow the display unit 230 to display the information on the components, contents, calories, freshness, and the like of the foods as the object to be inspected obtained in the above described manner.

FIG. 8 shows the example of the food analyzer 200, however, a device having nearly the same configuration may be used as the above described non-invasive measurement device of other information. For example, the device may be used as a living organism analyzer that performs analysis of living organism components such as measurement, analysis, or the like of body fluid components of blood or the like. The living organism analyzer as a device for measurement of the body fluid components of blood, for example, as a device for sensing ethyl alcohol, may be used as a drunk driving prevention device that detects the influence of alcohol of a driver. Further, the device may be used as an electronic endoscopic system including the living organism analyzer.

Furthermore, the device may be used as a mineral analyzer that performs component analyses of minerals.

In addition, the tunable interference filter, the optical module, and the electronic apparatus according to the invention may be applied to the following devices.

For example, by changing the intensity of the lights having respective wavelengths with time, data can be transmitted by the lights having respective wavelengths. In this case, a light having a specific wavelength is spectroscopically separated by the tunable interference filter provided in the optical module and received by the light receiving unit, and thereby, the data transmitted by the light having the specific wavelength may be extracted. Optical communications may be performed by processing the data of the lights having respective wavelengths using an electronic apparatus having the optical module for data extraction.

Further, as the electronic apparatus, the configuration may be applied to a spectroscopic camera, a spectroscopic analyzer, and the like that image spectroscopically separated images by spectroscopic separation of light using the tunable interference filter according to the invention. As an example of the spectroscopic camera, there is an infrared camera containing the tunable interference filter.

Figure 9:
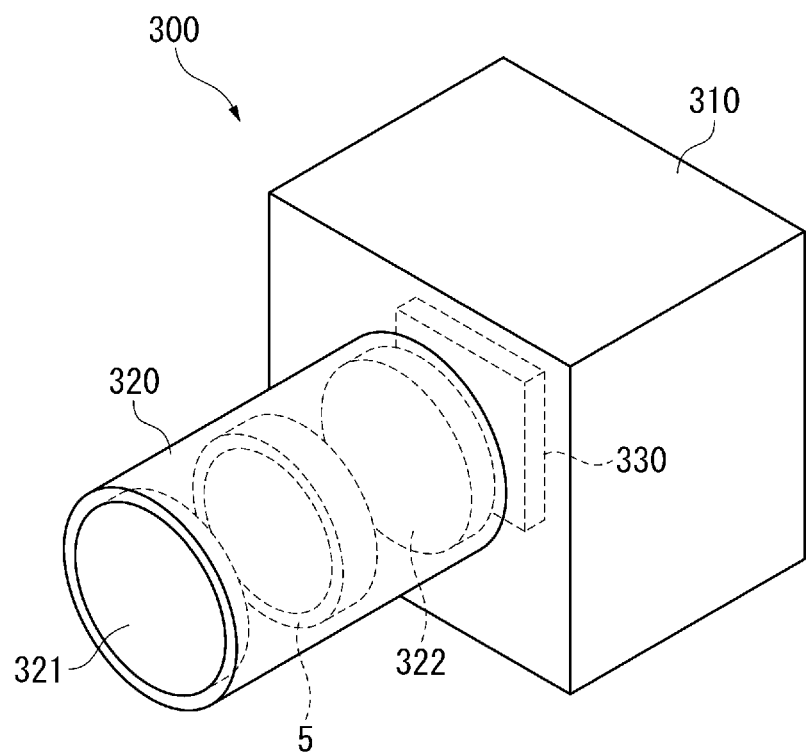
FIG. 9 is a schematic diagram of a spectroscopic camera as another example of the electronic apparatus according to the invention.

FIG. 9 is a diagram showing a schematic configuration of a spectroscopic camera. As shown in FIG. 9, the spectroscopic camera 300 includes a camera main body 310, an imaging lens unit 320, and an imaging unit 330 (detection unit).

The camera main body 310 is a part grasped and operated by a user.

The imaging lens unit 320 is provided in the camera main body 310 and guides entering image light to the imaging unit 330. Further, the imaging lens unit 320 includes an objective lens 321, an image forming lens 322, and the tunable interference filter 5 provided between these lenses as shown in FIG. 9.

The imaging unit 330 includes a light receiving device and images the image light guided by the imaging lens unit 320.

In the spectroscopic camera 300, a light having a wavelength to be imaged is transmitted through the tunable interference filter 5, and thereby, a spectroscopically separated image of a light having a desired wavelength may be obtained.

Furthermore, the tunable interference filter according to the invention may be used as a bandpass filter, and, for example, may be used as an optical laser device that spectroscopically separates and transmits only lights in a narrow band around a predetermined wavelength of the lights in a predetermined wavelength range output by a light emitting device using the tunable interference filter.

Further, the tunable interference filter according to the invention may be used as a biometric identification device, and, for example, may be applied to an identification device of blood vessels, finger prints, retina, iris, or the like using lights in the near-infrared range and the visible range.

Furthermore, the optical module and the electronic apparatus may be used as a concentration detector. In this case, the concentration of an object to be detected in a sample is measured by spectroscopic separation and analysis of infrared energy (infrared light) output from a material using the tunable interference filter.

As shown above, the tunable interference filter, the optical module, and the electronic apparatus according to the invention may be applied to any device that spectroscopically separates a predetermined light from incident lights. Further, as described above, the tunable interference filter according to the invention may spectroscopically separate plural wavelengths by one device, and thus, measurement of spectra of the plural wavelengths and detection of plural components may be performed with high accuracy. Therefore, compared to the device in the past that extracts a desired wavelength using plural devices, downsizing of the optical module and the electronic apparatus may be promoted and the tunable interference filter may preferably be used as a portable or vehicle-mounted optical device, for example.

In addition, the specific structures when the invention is implemented may be appropriately changed to other structures within a range in which the purpose of the invention may be achieved.

What is claimed is:

1. A tunable interference filter comprising:
    a first substrate;
    a second substrate that is disposed so as to oppose to the first substrate;
    a first reflection film that is disposed between the first substrate and the second substrate;
    a second reflection film that is disposed between the first reflection film and the second substrate;
    a first electrode that is disposed between the first substrate and the second substrate; and
    a second electrode that is disposed between the first electrode and the second substrate,
    wherein the first electrode is disposed between the first reflection film and the first substrate,
    when viewed in the direction from the second substrate to the first substrate, the first reflection film overlaps with a first portion of the first electrode, a second portion of the first electrode is disposed at an outside of the first reflection film, and the first portion is disposed at an outside of the second reflection film, and
    a first gap between the first reflection film and the second reflection film is smaller than a second gap between the first portion of the first electrode and the second electrode.

2. The tunable interference filter according to claim 1,
    the first electrode and the first reflection film electrically connecting at an overlapping region of the first electrode and the first reflection film.

3. The tunable interference filter according to claim 1,
    the first gap being controlled by applying voltage between the first electrode and the second electrode.

4. An optical module comprising the tunable interference filter according to claim 1.

5. An electronic apparatus comprising the tunable interference filter according to claim 1.

6. The tunable interference filter according to claim 1, wherein the first substrate includes a first reflection film fixing portion defined by a step, the first reflection film being positioned on the first reflection film fixing portion, and extending over the step.

7. The tunable interference filter according to claim 1, wherein the first reflection film is formed of a single material that continuously extends to contact the first electrode such that the first reflection film entirely overlaps the second reflection film in a plan view of the tunable interference filter.

8. The tunable interference filter according to claim 1, wherein the first portion and the second portion are unitary.

* * * * *